(12) United States Patent
Mihailescu et al.

(10) Patent No.: US 8,519,343 B1
(45) Date of Patent: Aug. 27, 2013

(54) MULTIMODE IMAGING DEVICE

(75) Inventors: Lucian Mihailescu, Pleasant Hill, CA (US); Kai M. Vetter, Alameda, CA (US)

(73) Assignee: U.S. Department of Energy, Washington, DC (US)

( * ) Notice: Subject to any disclaimer, the term of this patent is extended or adjusted under 35 U.S.C. 154(b) by 268 days.

(21) Appl. No.: 13/093,271

(22) Filed: Apr. 25, 2011

(51) Int. Cl.
*G01T 1/20* (2006.01)

(52) U.S. Cl.
USPC .......................................... 250/367

(58) Field of Classification Search
USPC .......................................... 250/367
See application file for complete search history.

(56) References Cited

U.S. PATENT DOCUMENTS

| | | | | |
|---|---|---|---|---|
| 5,821,541 A | * | 10/1998 | Tumer | 250/370.09 |
| 8,129,686 B2 | * | 3/2012 | Zelakiewicz et al. | 250/363.06 |
| 2009/0122958 A1 | * | 5/2009 | Mihailescu et al. | 378/87 |

* cited by examiner

*Primary Examiner* — David Porta
*Assistant Examiner* — Hugh H Maupin
(74) *Attorney, Agent, or Firm* — Michael J. Dobbs; Daniel D. Park; John T. Lucas

(57) ABSTRACT

Apparatus for detecting and locating a source of gamma rays of energies ranging from 10-20 keV to several MeV's includes plural gamma ray detectors arranged in a generally closed extended array so as to provide Compton scattering imaging and coded aperture imaging simultaneously. First detectors are arranged in a spaced manner about a surface defining the closed extended array which may be in the form a circle, a sphere, a square, a pentagon or higher order polygon. Some of the gamma rays are absorbed by the first detectors closest to the gamma source in Compton scattering, while the photons that go unabsorbed by passing through gaps disposed between adjacent first detectors are incident upon second detectors disposed on the side farthest from the gamma ray source, where the first spaced detectors form a coded aperture array for two or three dimensional gamma ray source detection.

20 Claims, 10 Drawing Sheets

MULTIMODE IMAGING DEVICE

CONTRACTUAL ORIGIN OF THE INVENTION

The United States Government has rights in this invention pursuant to Contract No. DE-AC02-05CH11231 between the United States Department of Energy and The Regents of the University of California for the management and operation of the Lawrence Berkeley National Laboratory. The U.S. Government has certain rights in this invention.

TECHNICAL FIELD

This invention relates generally to the detection of high energy gamma rays and is particularly directed to detecting, imaging and locating a source of high energy gamma rays for use in such areas as nuclear medicine, industrial applications, security measures and scientific research.

BACKGROUND

Radioactive materials are often detected and identified by measuring gamma-rays emitted from the materials. The energy of gamma-rays is specific to that particular material and acts as a "finger print" to identify the material. A high resolution detector typically has better sensitivity and identification capability. In the following discussion, the terms "gamma rays", "radiation", and "photons" are used interchangeably.

The ability to detect gamma rays is a vital tool for many areas of research. Gamma-ray detectors allow scientists to study celestial phenomena and diagnose medical diseases, and they have been used to determine the yield in an underground nuclear test. Today, these detectors are an important tool for homeland security, helping the nation confront new security challenges. Government agencies need detectors for the scenarios in which a terrorist might use radioactive materials to fashion a destructive device targeted against civilians, structures, or national events. To better detect and prevent terrorist attacks, the Department of Homeland Security (DHS) is funding projects to develop a suite of detection systems that can search for illicit radioactive sources in different environments.

Researchers from National Laboratories have been applying their expertise in radiation detection for more than 30 years. For example, detectors have been designed for use in treaty inspections can monitor the location of nuclear missile warheads in a nonintrusive manner. These detectors measure the gamma rays emitted from the isotopes of nuclear elements contained in weapons. Over the years, Laboratory researchers have developed a range of radiation detection instruments, including detectors on buoys for customs agents at U.S. maritime ports, cargo interrogation systems, and high-resolution handheld instruments that emergency response personnel could use to search for a clandestine nuclear device.

Gamma rays have the highest energy in the electromagnetic spectrum. They tend to go straight through matter, rather than reflect or bend as visible light does. Minors or lenses cannot be used to depict, or image, gamma rays, but their energy can be measured indirectly by observing how photons interact with a detector material. For many applications, however, researchers need to accurately determine where gamma rays originate, and doing so requires imaging technology. For example, many radiation detectors have excellent energy resolution and sensitivity to sources within a range of several meters. At greater distances, however, the source can be lost in a clutter of background gamma-ray emission from the environment, including concrete, natural mineral deposits, and some foods.

Detector developers want to design instruments that quickly survey large areas at a distance and accurately distinguish illicit from background signals. However, when a detector covers a large area, the signal from an object in the background can mimic the signature from a source of interest, even though the sources are widely separated. For example, a concrete building 20 meters from the detector may register the same as an illicit source located farther away. This similarity makes the detection of weak signals impossible unless the characteristics of the background are known in advance—unlikely in searches for clandestine radioactive materials.

Most state of the art gamma-ray imagers are collimator-based systems. They normally contain a collimating part that is made of a heavy, high Z material, such as lead or tungsten, and a position sensitive radiation detector. The imaging functionality relies on the fact that the collimator blocks the gamma-rays falling on it, casting a shadow on the detector surface. An image reconstruction algorithm analyzes the shadow, reconstructing the spatial distribution of tile radiation source. These gamma-ray imagers work well with low energy gamma-rays, but for gamma-rays of increasing energies, the collimators lose their absorbing efficiency, leading to low contrast, low sensitivity imaging.

Applications of gamma ray imaging such as those used in search and surveillance scenarios, as well as in applications which require mapping of radioactive sources distributed within a large field-of-view in the medium to large-field distances, require a different solution than the ones offered by standard tomographic methods.

Standard imaging systems are based on either collimator imaging or Compton scatter imaging, with collimator imaging more effective at lower gamma ray energies and Compton scatter imaging more efficient at higher gamma ray energies. Collimator-based imaging typically employs coded apertures for improved detector sensitivity. To date, there is no gamma ray detector arrangement which offers the high efficiency of coded apertures for low energy photons with the high efficiency and large field of view of Compton imagers for gamma rays, or photons, of higher energies for improved detection sensitivity and source location over the entire gamma ray spectrum.

SUMMARY

A system in one embodiment comprises an array of radiation detectors; and an array of imagers positioned behind the array of detectors relative to an expected trajectory of incoming radiation.

A method in another embodiment comprises detecting incoming radiation with an array of radiation detectors; detecting the incoming radiation with an array of imagers positioned behind the array of detectors relative to a trajectory of the incoming radiation; and performing at least one of Compton imaging using at least the imagers and coded aperture imaging using at least the imagers.

A method in yet another embodiment comprises detecting incoming radiation with an array of imagers positioned behind an array of detectors relative to a trajectory of the incoming radiation; and performing Compton imaging using at least the imagers.

Accordingly, it is an object of the present invention to detect and locate sources of high energy gamma rays.

It is another object of the present invention to provide a gamma ray detector which makes use of both Compton scattering and coded aperture imaging functionalities in a single device.

Still another object of the present invention is to provide an arrangement for detecting gamma rays which employs modular detectors in a wide range of configurations which affords efficient Compton imaging and coded aperture imaging at the same time.

A further object of the present invention is to provide a compact gamma ray detection arrangement capable of detecting and locating sources of gamma rays in the range of 10-20 KeV to several MeV's.

The present invention makes use of modular detectors in configurations that allow for efficient Compton imaging and coded aperture imaging simultaneously. The inventive modular detector arrangements optimize both imaging functionalities, while extending the overall detection imaging efficiency for gamma rays of energy ranging from 10-20 KeV to several MeV's. These inventive modular detector arrangements can use any material capable of forming a compact radiation detector and provide improved efficiency for detecting a radiation source as well as the location of the source. The individual modular detectors may or may not be position sensitive, and may have sizes ranging from 1 cm on each side to 10 cm on each side. Various semiconductor materials may be used in these inventive detector arrays such as CdTe, CdZnTe, pixilated CdZnTe, and coplanar grid CdZnTe. Detectors in the form of scintillators may also be used in the present invention, such as $LaBr_3(Ce)$, $LaCl_3(Ce)$, $SrI_2$, $BaI_2$, and NaI(Tl). The use of detectors affording better energy resolution are preferred in the present invention because of the improved spectroscopic imaging performance offered by these detectors.

Other aspects and embodiments of the present invention will become apparent from the following detailed description, which, when taken in conjunction with the drawings, illustrate by way of example the principles of the invention.

DETAILED DESCRIPTION

Figure 1:
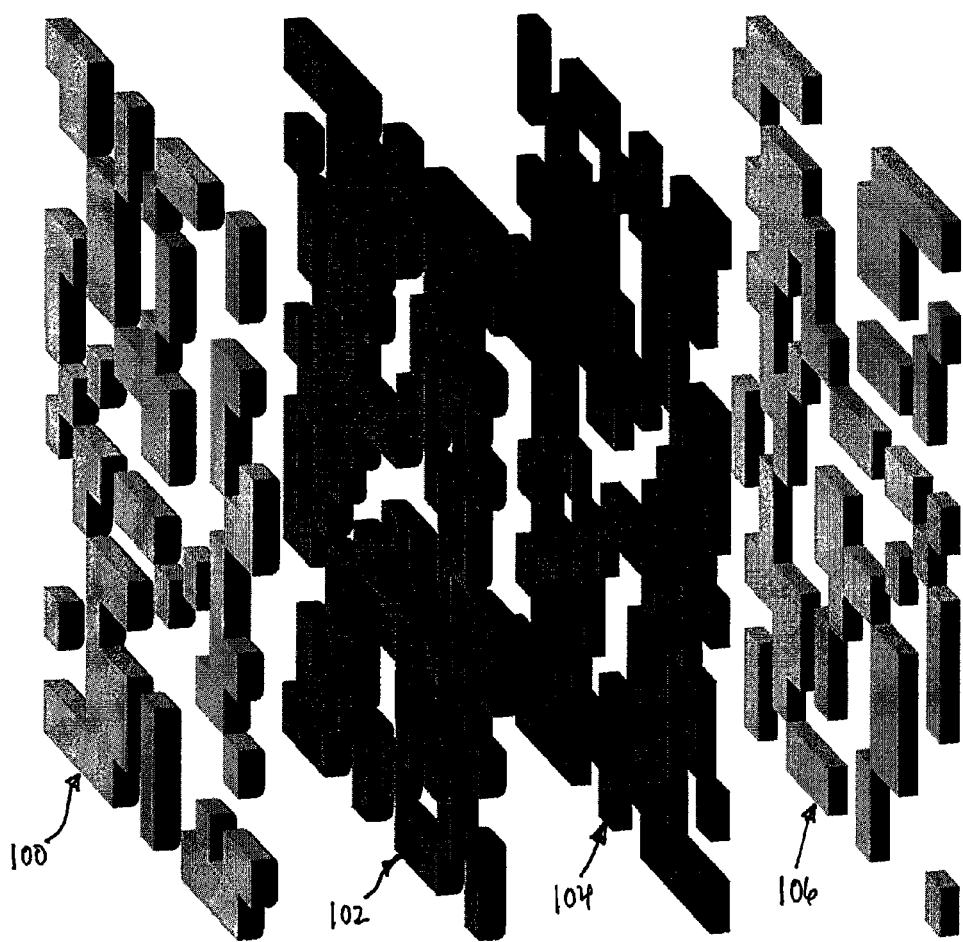
FIG. 1 is a perspective view of four spaced layers of detectors in a hybrid coded-aperture Compton camera configuration in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

A system in one general embodiment includes an array of radiation detectors, and an array of imagers positioned behind the array of detectors relative to an expected trajectory of incoming radiation. Note that for any embodiment, and as discussed in more detail below, the detectors and imagers may have the same construction and functionality, or different construction and/or functionality, depending on the intended use of the system.

A method in one general embodiment includes detecting incoming radiation with an array of radiation detectors, detecting the incoming radiation with an array of imagers positioned behind the array of detectors relative to a trajectory of the incoming radiation, and performing at least one of Compton imaging using at least the imagers and coded aperture imaging using at least the imagers.

In another general embodiment, the imagers can be used by themselves for Compton imaging, e.g., by using scatterings across the imagers. Accordingly, a method according to the general embodiment comprises detecting the incoming radiation with an array of imagers positioned behind an array of detectors relative to a trajectory of the incoming radiation; and performing Compton imaging using at least the imagers.

Note also that the operational role of the imagers and detectors can be reversed for gamma-rays coming from another direction. In other words, a given device may provide bidirectional, and even multi-directional detection and tracking capabilities.

The following description presents a new radiation imaging concept that combines coded aperture principles with Compton imaging principles. This hybrid functionality results in systems that are sensitive to radiation such as gamma-rays in a very broad range of energies, such as from about 10 kiloelectronvolts (keV) to several megaelectronvolts (MeV). Some embodiments do not use collimators in the classic sense, but rather use active detectors that act as collimators and imagers (which themselves may be detectors), at the same time. This approach makes use of collimation-based imaging for gamma-rays of low-energies, where this imaging functionality is most efficient. For higher energy photons, imaging is done by Compton scatter imaging. The detectors and imagers may be mounted on a frame or frames in two or more layers. Each layer of detectors or imagers forms a pattern that helps imaging by using the coded aperture functionality, without compromising Compton imaging functionality.

While much of the description described herein will be described in terms of gamma ray imaging, this has been done by way of example only and to provide one possible context for the teachings herein. It will be appreciated by those skilled in the art that the teachings herein may be extended to other types of radiation.

FIG. 1 is a perspective view of four spaced layers of detectors 100, 102, 104 and 106 in a hybrid coded-aperture Compton camera configuration in accordance with one embodiment of the present invention. Such a radiation (e.g., gamma-ray) imaging system may combine the high efficiency of coded apertures, defined between the detectors, for low energy photons with the high efficiency and large field of view of Compton imagers for photons of higher energies in a hybrid imaging system.

Note that, as will soon become apparent, the imagers may be detectors themselves, and may have the same, similar or different construction and/or functionality as the detectors in the first array. Accordingly, the term "detectors" as used herein may apply to both the aforementioned imagers as well as the aforementioned detectors.

More than two arrays of detectors/imagers may be present. Any number of arrays may be used, such as 3, 4, 5, 6, 7, 8, 10, 12, etc. In some embodiments, the designation or function as detectors and imagers may be interchangeable. For example, the direction of the incident gamma-ray may determine how the detectors are used, e.g. as collimators or imagers. Moreover, where more than two arrays are present, as in FIG. 1, some imagers may function as both imagers and collimators for radiation traversing more than two arrays.

In one approach, modular detectors are used. These detectors can then be supported by one or more frames, preferably of a material that does not interfere with the incoming gamma rays and/or their detection. For portable units, the frames are preferably lightweight, e.g., of plastic.

For improved performance, some or all of the detectors and/or imagers can be position sensitive. For example, pixilated CdZnTe (CZT) or scintillating detectors can be used. Moreover, the detectors and/or imagers can be semiconductor detectors. Exemplary semiconductor detectors include but are not limited to CdTe, CdZnTe, pixilated CdZnTe and a coplanar grid of CdZnTe. The detectors may be arranged in two or more layers.

A hybrid coded-aperture-Compton-scatter imaging system can use room-temperature position sensitive CZT detectors. The use of CZT detectors allows for a relatively easy arrangement of the individual detectors on a variety of patterns. Since no cooling of detectors is required, the CZT detectors can be easily mounted on a light weight plastic frame that defines the pattern.

Alternatively, scintillating detectors can be used. Due to their good energy resolution, $LaBr_3(Ce)$ scintillators may be a good choice. Taking advantage of their small size, avalanche photodiodes (APD) can be used to read-out such scintillators. Additional exemplary scintillating detectors include but are not limited to $LaCl_3(Ce)$, $SrI_2$, $BaI_e$ and $NaI(Tl)$.

In one particularly preferred embodiment, the system uses small (about 15×15×5 mm$^3$), pixilated CZT detectors. It should be noted that larger or smaller detectors may be used, e.g., [1 to 100 mm]×[1 to 100 mm]×[0.5 to 50 mm].

Figure 2:
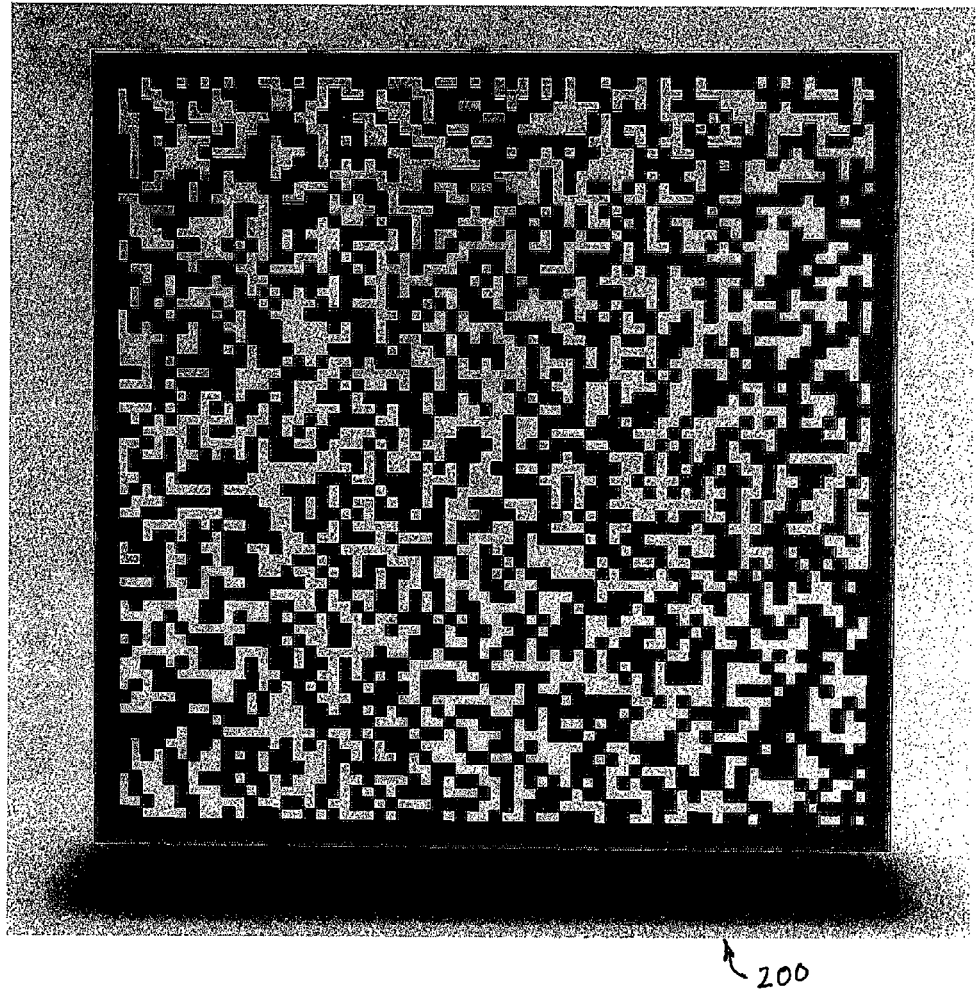
FIG. 2 is a front representational view of one illustrative coded aperture pattern that may be implemented in an imaging system according to one embodiment.
Figure 3:
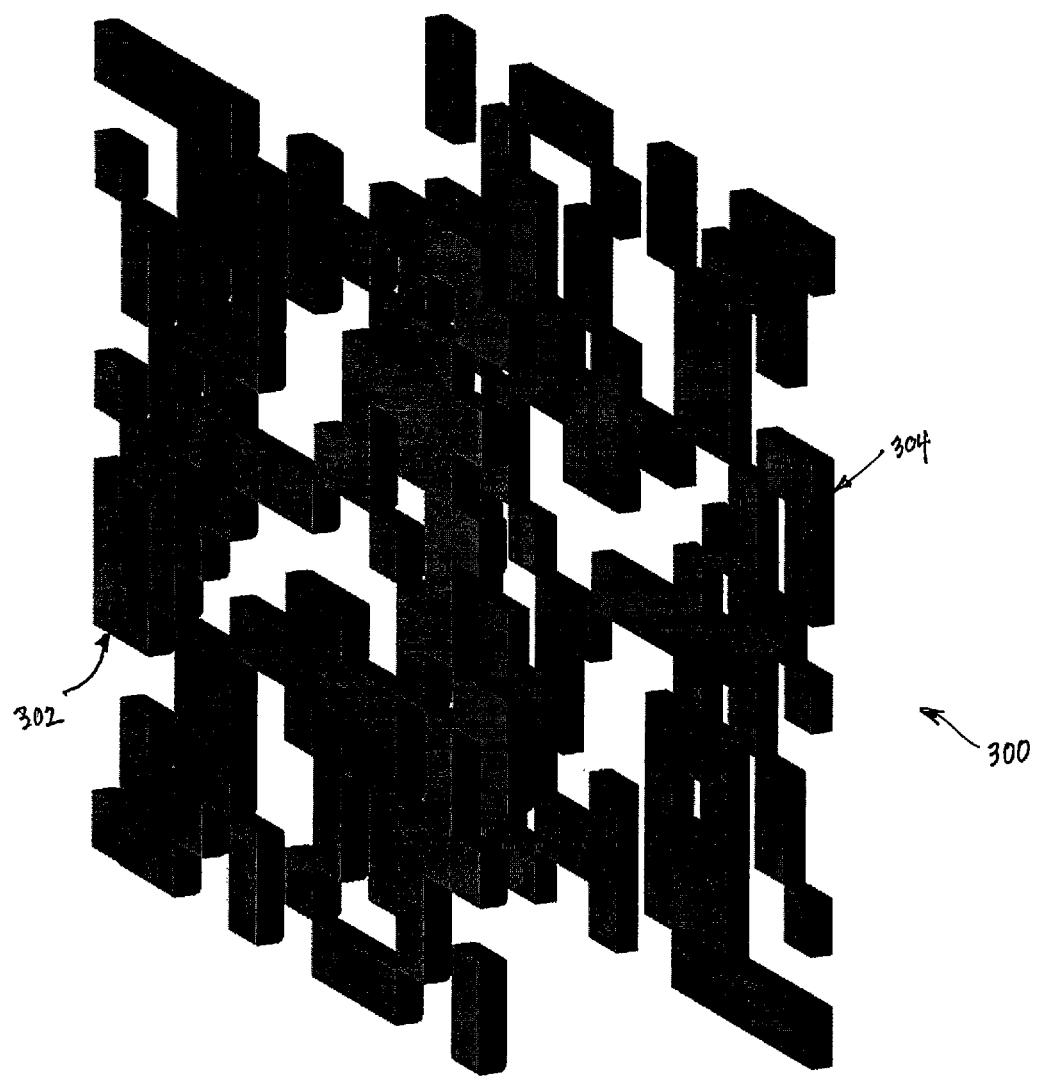
FIG. 3 is a front representational view of another illustrative pattern, showing detectors and imagers in a mask/antimask configuration, that may be implemented in an imaging system according to one embodiment.

The arrangement of the individual detectors within a layer will make a pattern similar to the patterns used in coded aperture masks. FIG. 2 illustrates one illustrative coded aperture pattern 200 that may be implemented in a system of detectors in one approach. FIG. 3 illustrates another illustrative pattern 300, showing detectors 302 and imagers 304. Patterns similar to Fresnel zone plates can also be used.

The layering structure provides two types of functionality. First, with reference to FIG. 4, the system 400 may perform coded aperture imaging by selecting single interaction events that have an energy below a certain threshold. One or more layers of detectors 402 acts as an active mask for other layer(s) of detectors 404 behind it. The shadows cast by one layer onto the other provide image coding, especially for lower energy gamma-rays for which the cross section for photoelectric absorption is higher than for Compton scattering.

The coded aperture functionality may be primarily used for photons that produce only one interaction in the detection system. This selection of events will predominantly pick up low energy photons that are absorbed in a photoelectric interaction. This selection applies mainly to events with deposited energies that are in the low range of energies (below 200-300 keV). Image coding is obtained by the attenuation of the gamma-ray intensity flux in the detector elements that are interposed between the interaction point and the image space. The back-projection of the detected gamma-ray photons onto the image space may account for the before mentioned attenuation. Image reconstruction algorithms may be used to correct for the point spread function in each element of the image space. Finally, a distribution of the gamma-ray source may be obtained. The image reconstruction algorithms can be iterative and/or analytic.

In one illustrative approach, as the detector picks up gamma-ray signals, the photon passing through the masking array casts shadows on the detector elements, which the imager array records. The detector elements also measure the signal count and position. As the instrument travels through an area, it accumulates several shadow patterns, or "shadowgrams," and creates a pixel map of the radiation field of the surveyed region.

Each pixel represents an area in the field of view. The pixels are small enough that, when combined, they generate a detailed image of a source of interest. With one map of pixels, distances out to 100 meters or more can be covered.

The image generated from a coded-aperture process may be derived from the variation in gamma-ray signal counts versus signal position on a detector. In an ideal situation, only the shadow cast by the masking array would cause these variations. However, one shortfall of coded-aperture imagers is that gamma-ray sources outside an instrument's field of view can contribute to the signal count. This incident radiation may create shadows that cause the image to blur.

Figure 5:
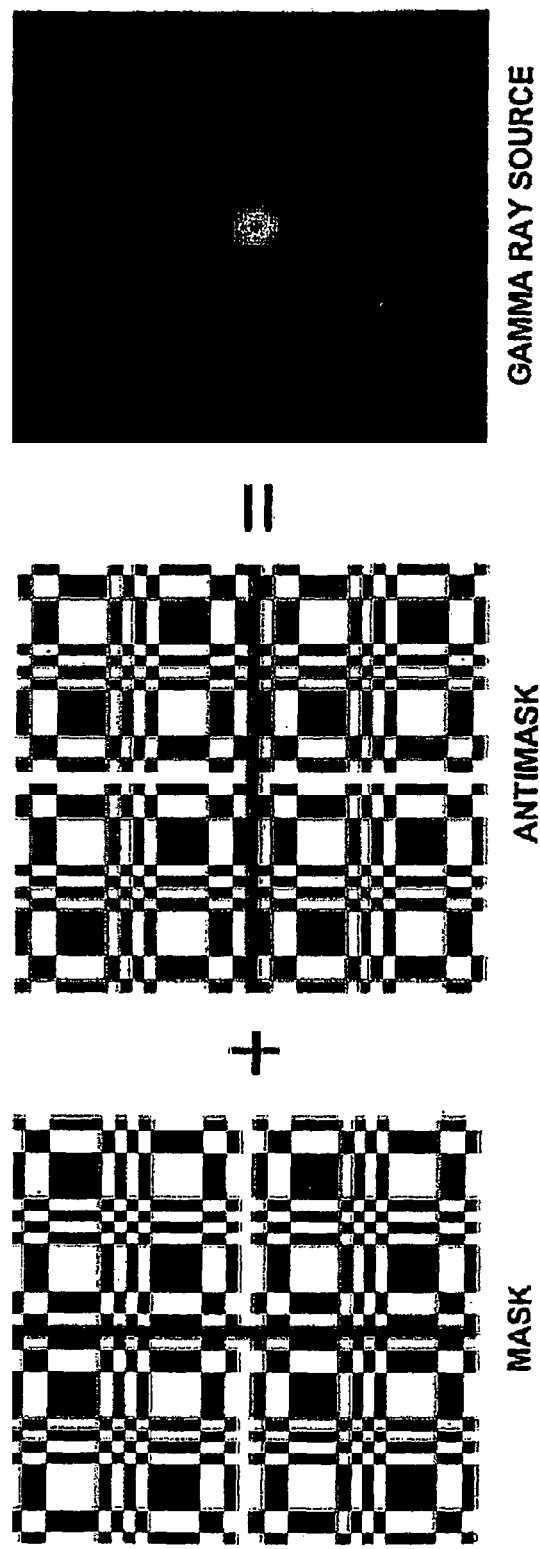
FIG. 5 is a representational view depicting how combining a mask with an antimask whose hole pattern is the inverse of the mask's pattern effectively removes background signals outside the surveyed area.

To compensate for the incident radiation, an antimask array whose hole pattern is the inverse of the pattern on the masking layer may be used. The mask and the antimask are exposed to the source at the same time. Background signals outside the field of view are considered extraneous signals. By subtracting the measurement taken with one mask from the inverse measurement taken with the antimask, only those signals that passed twice through the masks—once through the mask and once through the antimask—remain. FIG. 5 illustrates how combining a mask with an antimask whose hole pattern is the inverse of the mask's pattern effectively removes background signals outside the surveyed area.

Figure 4:
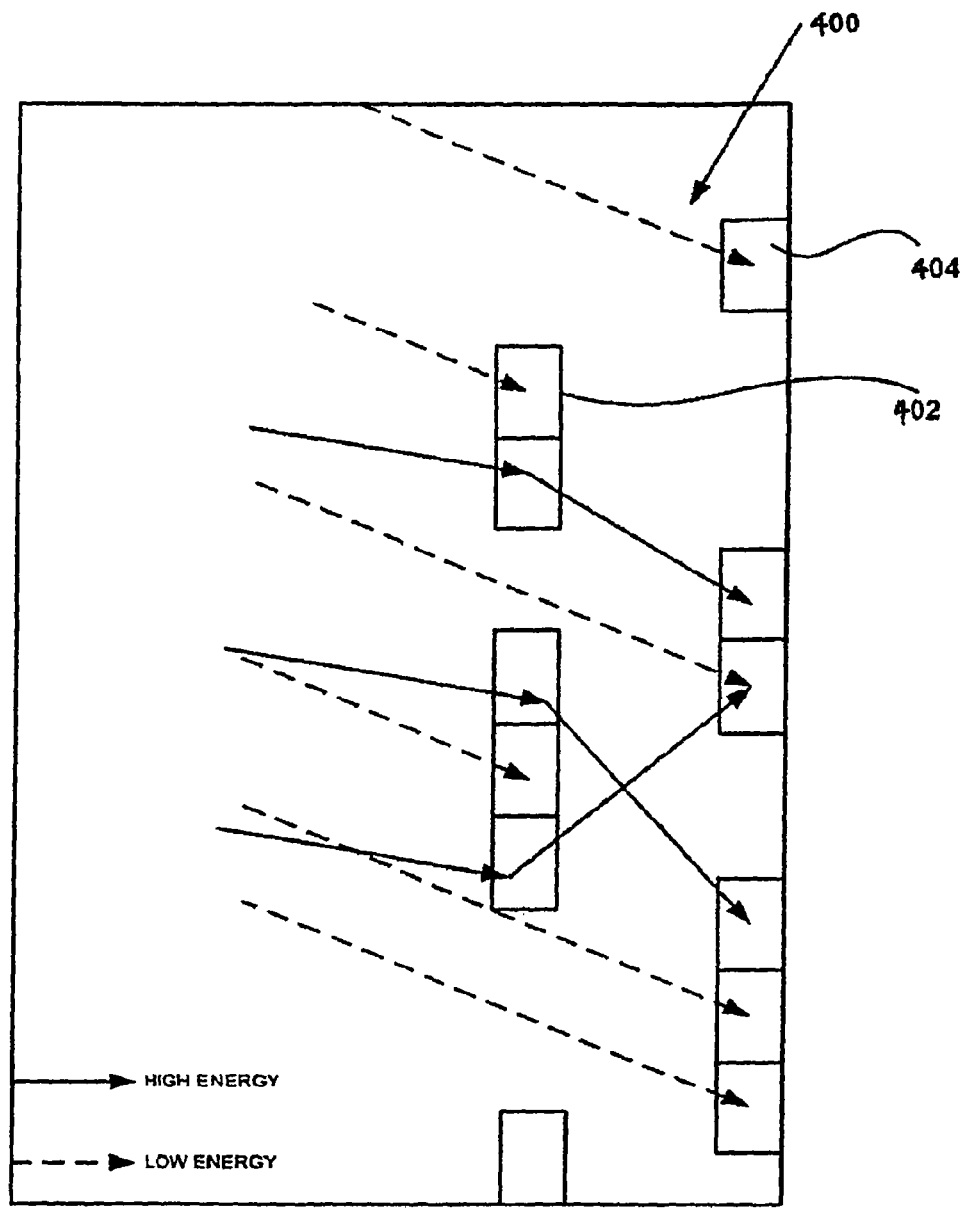
FIG. 4 is a representational view depicting how gamma rays travel through an imaging system according to one embodiment.

Second, with continued reference to FIG. 4, the system 400 may function as a Compton imager by selecting photons with multiple scatterings within or across layers. This functionality is especially important for high energy gamma-rays for which the cross section for Compton scattering is dominant.

Compton imaging is based on the observation that photons, such as x or gamma rays, can scatter on electrons in a material. This phenomenon is known as the Compton effect. According to quantum theory, a photon can transfer part of its energy to a loosely bound electron when the two collide. Because x- and gamma-ray photons have high energy, such collisions may transfer so much energy to an electron that it is ejected from its atom. The scattering of photons as they pass through and interact with a material is called Compton scattering.

Compton scattering is the principal absorption mechanism for gamma rays between 100 and 3,000 kiloelectronvolts. Uranium and plutonium both naturally emit radiation within this energy range. Below this range, photoelectric absorption is the dominant interaction type.

The detectors used for Compton imaging according to various embodiments can be designed using various detector materials in different configurations. The key to optimizing imaging efficiency is to induce multiple interactions between the gamma ray and the detector material so the system can detect the full energy of the incident gamma ray. The gamma-ray interactions should be separated in space sufficiently so that they can be easily distinguished from each other and their positions can be accurately measured to obtain high angular resolution.

One requirement for Compton imaging is that a gamma ray must interact with electrons at least twice—once to induce Compton scattering and once to allow photoelectric absorption or another Compton scattering—although more than one scatter can occur. For example, a 1-megaelectronvolt gamma ray averages three Compton scattering interactions before it is finally photoelectrically absorbed by germanium. When an x- or gamma-ray photon is scattered or absorbed, high-energy electrons are ejected. The subsequent deposition of electron energy produces a large number of ionized atoms. The ionization from Compton scattering or photoelectric absorption is then recorded by the detectors.

Note that Compton imaging can be performed even if not all the energy of the photon is deposited in the detector. Sometimes, the user can assume the incident energy of the photon known (especially if a radioactive tracer with known gamma-ray lines is used), or it can be derived from other previously-available information.

In one particularly preferred approach, detectors of superior energy and position resolution and granularity are used for the Compton imaging functionality. Such detectors should be able to provide the positions and energies of individual gamma ray interactions taking place in the detection system. As noted above, this imaging approach requires an incident gamma ray to interact at least twice in the detector: one Compton scattering and one other interaction, which can be either another Compton scattering or photoelectric absorption. Using the Compton scattering formula (Equation 1) for the first Compton scattering interaction taking place in the detector, the necessary imaging information is obtained.

$$\cos\theta = 1 + \frac{511}{E_r} - \frac{511}{E_r'}; E_r' = E_r - E_1 \quad \text{Equation 1}$$

Figure 6A:
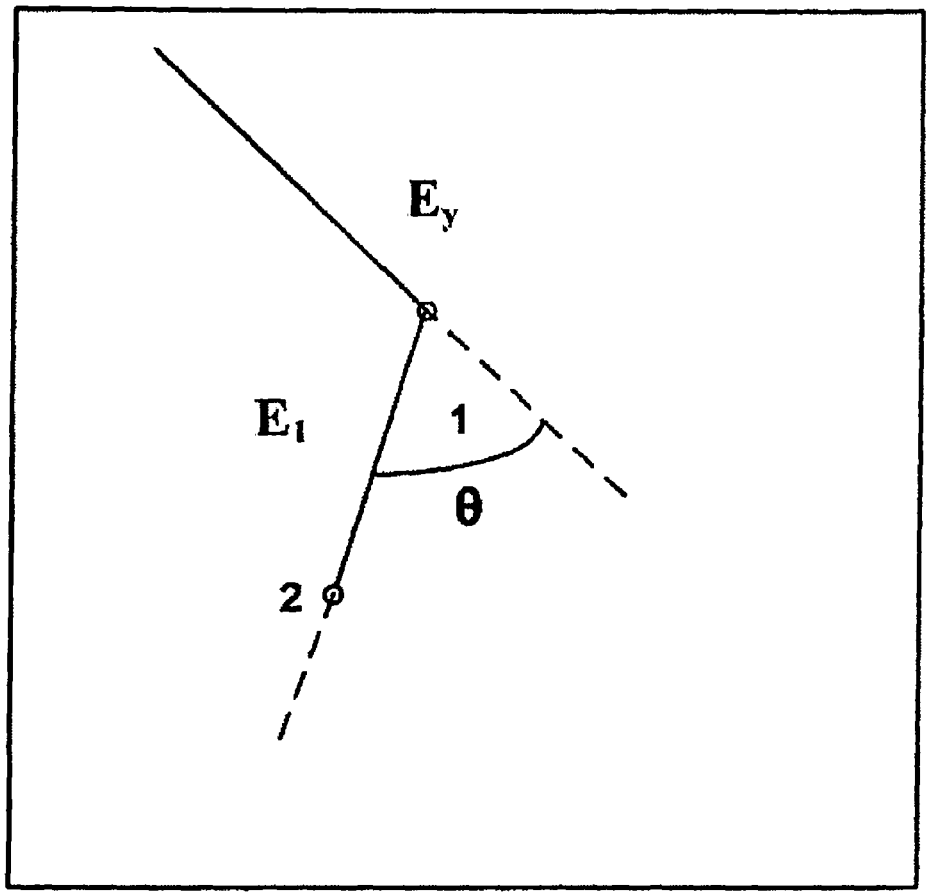
FIG. 6A is a chart depicting gamma ray events, angles and energy used to calculate a Compton cone.
Figure 6B:
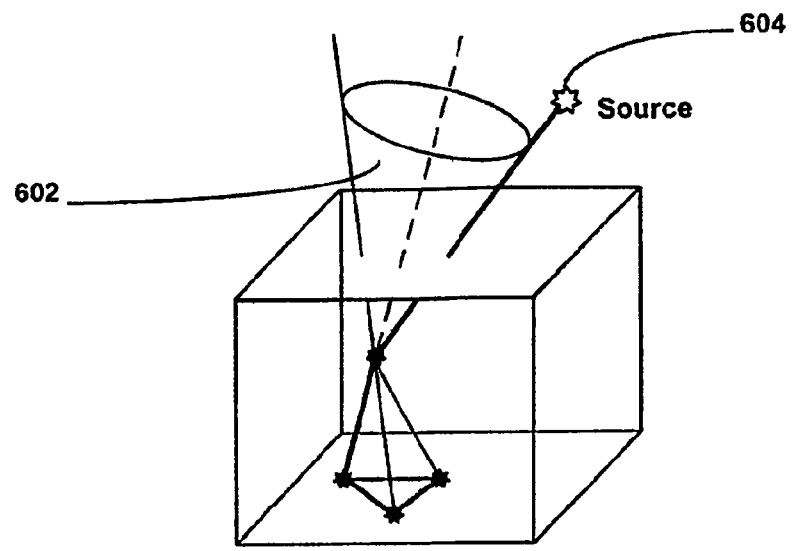
FIG. 6B is a representational view depicting how incoming gamma rays interact with a detector through Compton scattering, and particularly how the energies and positions of the first two interactions define a cone of incident angles.
Figure 6C:
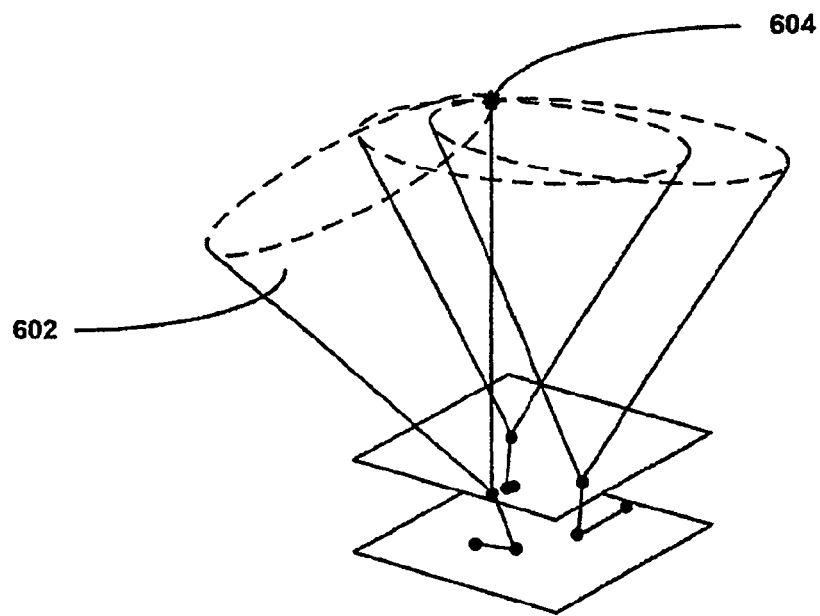
FIG. 6C is a representational view depicting how Compton cones for all imaged events are backprojected onto the assumed image space, e.g., plane or sphere to produce a two-dimensional image of the source.

Referring to FIG. 6A and Equation 1, the Compton scattering formula connects the scattering angle θ, the energy of the incident gamma ray $E_\gamma$, and the energy of the first interaction $E_1$ (both energies are in keV units). Referring to FIG. 6B, the scattering angle θ around the scattering direction determines a cone 602 on the surface of which the gamma-ray source 604 can be found. This is known as a "Compton cone". Referring to FIG. 6C, the Compton cones for all imaged events are then back-projected onto the assumed image space, e.g., plane or sphere (one circle per gamma-ray event) to produce a two-dimensional image of the source.

The image space can also be a cube, or any other representation, to produce a three-dimensional image of the source. This can be done, especially if the imaging system acquires data from different positions, so that parallax information becomes available, hence, depth of source can be deduced.

The backprojection may also account for the attenuation produced by the detection material found between the image space and the vertex of the cone. This attenuation may provide supplementary image coding, which is similar to the coded aperture coding. The coded aperture coding can be taken into account for estimating the backprojected point spread function.

Image reconstruction algorithms may be used to deconvolve for the characteristic Compton imaging point spread function. The image reconstruction algorithms can be iterative and/or analytic.

In any of the approaches set forth above, for coded aperture imaging and/or Compton imaging, the system may include a processor, e.g., microprocessor, CPU running software, ASIC, etc. that merges image information based on the detected gamma rays with visual images. In one approach, the imaging system includes a camera to capture an environment of the source of the gamma rays. Such camera may include or be part of a Red-Green-Blue (RGB) camera, a laser radar imager, infrared camera, etc. The processor then generates a composite image depicting a representation of the source of the gamma rays and a representation of an environment of the source of the gamma rays.

Also, threat indication and/or diagnostics may also be performed based on the detection and/or imaging. For example, characterization or typing of the gamma rays or source thereof may be performed, e.g., using image-spectral analysis, etc. Moreover, trajectories and/or intensities of gamma rays may be determined. Also, coordinates of the approximate location of the source of the gamma rays may be calculated, e.g., with the assistance of physical models obtained from Laser radar imaging (Lidar) CAD models, or other computer vision systems.

Figure 7:
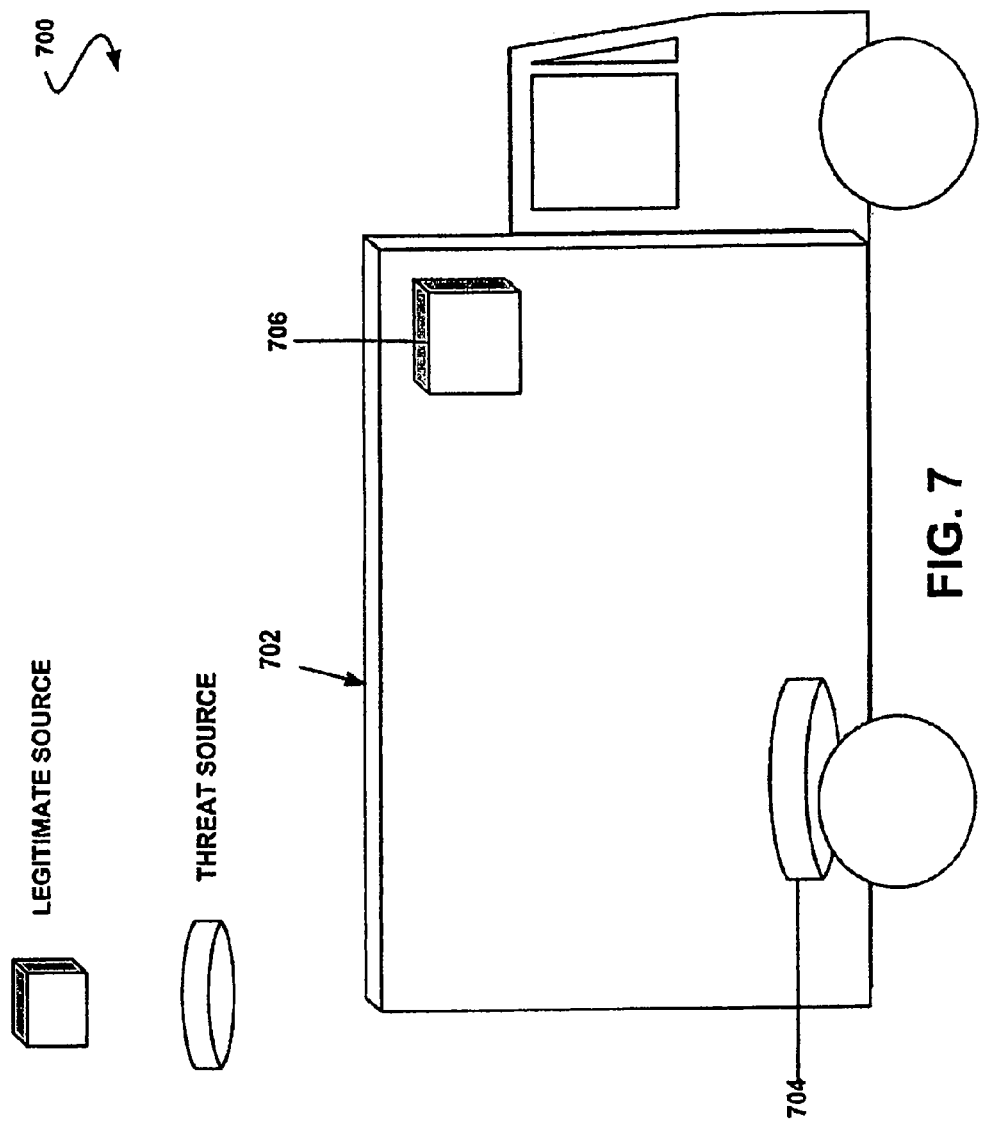
FIG. 7 is a graphical depiction of an illustrative composite image in which a truck is displayed with representations of two sources of gamma rays.

FIG. 7 illustrates an illustrative composite image 700 in which a truck 702 is displayed with representations of two sources 704, 706 of gamma rays. As shown, the representations of the two sources 704, 706 of gamma rays are shown at about their relative location in the truck 702. Analysis indicates that one source 704 is not a threat, but the other source 706 is a threat.

Provisional U.S. application Ser. No. 60/958,967, which is incorporated by reference herein, describes several embodiments and methods for combining three dimensional image information with gamma ray imaging. Also shown are composite images illustrating a representation of the source of the gamma rays and a representation of an environment of the source of the gamma rays.

The arrays may be organized in a planar or a cylindrical configuration. In the planar configuration, the imager may have planar detectors with orthogonal strips on each side connected to a preamplifier and a digital data-acquisition system to determine the three-dimensional (3D) position for each gamma-ray interaction. An illustrative Compton (only) imager which may be adapted to the teachings herein uses four layers of detectors: two silicon crystals and two germanium crystals, together measuring about 8 by 8 by 6 cubic centimeters. The detectors are manufactured at Lawrence Berkeley National Laboratory and the Research Centre Jülich in Germany. With its 3D position capability and combined detector materials, the system can track gamma-ray interactions to a resolution of 0.5 millimeter. Even these detectors can be used in a very simplistic "coded aperture" imaging modality, by observing the shadow cast by a detector onto the other. This can be used for imaging sources that have a simple spatial distribution, e.g. point sources.

A detection system based on tracking gamma rays provides unprecedented sensitivity not only for Compton imaging but also for nuclear spectroscopy, which is used to identify nuclear materials. The Compton imaging functionality can distinguish gamma rays that deposit only partial energy in the detector from those that are fully absorbed so background signals can be more easily eliminated. The illustrative system applies the Compton scattering formula to the positions of the first and second interactions to deduce the angle of the incident gamma ray to within a certain cone-shaped area.

Some embodiments may use high-resolution silicon and germanium detectors, which must remain at low temperatures to operate. Accordingly, in one approach, the detectors may be housed in one or more cryostats cooled by liquid nitrogen or mechanical coolers.

A few advantages of various embodiments as compared with present state-of-the-art systems are: increased imaging efficiency for photons in a large range of energies, e.g., from about 10 keV to several MeVs; option for good spectroscopic characteristics conferred by the use of room-temperature CZT detectors and some scintillators; large field of view; and ability to easily scale tip the system.

Embodiments of the present invention may be used in a wide variety of applications, and potentially any application in which imaging is useful.

Illustrative uses of various embodiments of the present invention include, but are not limited to, applications requiring gamma-ray imaging. Search, surveillance and monitoring of radioactive materials are a few such examples. Another application is mapping of radioactive sources distributed within a large field-of-view in the medium to large-field distances. Various embodiments can also be used in the nuclear fuel cycle, homeland security applications, nuclear non-proliferation, medical imaging, etc.

Yet other uses include detectors for use in treaty inspections that can monitor the location of nuclear missile warheads in a nonintrusive manner. Further uses include implementation in detectors on buoys for customs agents at U.S. maritime ports, cargo interrogation systems, and high-resolution instruments that emergency response personnel can use to search for a clandestine nuclear device.

Figure 8:
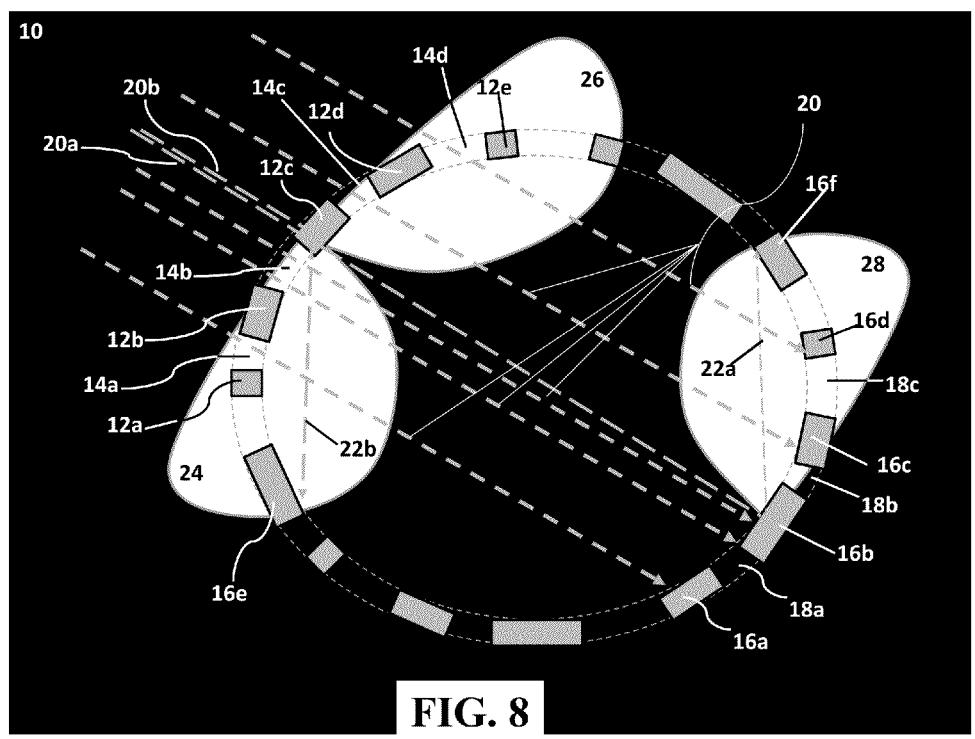
FIG. 8 is a simplified schematic illustration of a multi-mode imaging device in accordance with the principles of the present invention.

Referring to FIG. 8, there is shown a simplified schematic diagram of a multi-mode imaging device 10 in accordance with the principles of the present invention. Multi-mode imaging device 10 includes plural spaced detectors disposed in a spherical array similar to the placement of minor elements in a minor ball. Alternatively, the array can be cylindrical with the detector elements placed on the surface of the cylinder.

FIG. 8 shows a circular cross section of the array. Some of the detectors consist of multiple elements, thus they are represented by different sizes in FIG. 8. The different sizes of the detectors shown in FIG. 8 also represent the random coded aperture imaging arrangement, i.e., random sizes of the detectors, used in the present invention. Incident gamma rays, or photons, 20 emitted by a gamma ray source (not shown in the figure for simplicity) are directed onto the multi-mode imaging device 10 in a direction extending from an upper right-hand corner of FIG. 8 to a lower left-hand corner of the figure. First plural detectors 12a-12e are positioned in the area of the incident gamma rays 20. Because of the spaced array of detectors, a gap, or space, is disposed between adjacent detectors. A first gap 14a is disposed intermediate detectors 12a and 12b. Second, third and fourth gaps 14b, 14c and 14d are respectively disposed between detectors 12b and 12c, detectors 12c and 12d, and detectors 12d and 12e. Some of the incident gamma rays impinge on one of the first plural detectors 12a-12d, or transit a gap between adjacent first plural detectors. While this embodiment of the invention is described in terms of detecting and imaging gamma rays and locating the source of the gamma rays, it also can be used in detecting and imaging energetic neutrons and locating the source of the neutrons. In addition, while the present invention is illustrated in terms of two dimensions, it is also capable of providing very accurate scatter imaging in three dimensions.

Disposed on an opposed portion of the array of detectors are second plural detectors 16a-16d. Gaps, or spaces, are disposed between adjacent ones of the second plural detectors 16a-16d. Thus, gap 18a is disposed between detectors 16a and 16b, while gaps 18b and 18c are respectively disposed between detectors 16b and 16c and detectors 16c and 16d. While the detectors in FIG. 8 are shown as forming a circular array, the present invention is not limited to this configuration of the detectors, as the present invention also envisions the use of virtually any closed array of detectors where gamma rays are either incident upon one of first plural detectors or pass between adjacent first plural detectors and are incident upon second plural detectors arranged in a spaced manner from the first plural detectors.

As shown in FIG. 8, many of the incident gamma rays 20 travel through the space between adjacent first plural detectors 12a-12e and are incident upon one of the second plural detectors 16a-16d or transit a gap between adjacent ones of the second plural detectors 16a-16d. Other gamma rays will be incident upon one of the first plural detectors 12a-12e. Gamma rays of lower energy will primarily be absorbed in photoelectric interactions and will be imaged by coded aperture imaging as they will be either incident upon one of the second plural detectors 16a-16d or transit one of the gaps 18a-18c between adjacent ones of the second plural detectors. Higher energy gamma rays will primarily interact by Compton scattering before being absorbed in a photoelectric effect. Examples of these higher energy photons are shown in FIG. 8 for the case of incident photons 20a and 20b which respectively interact with detector 16b and detector 12c in producing secondary photons 22a and 22b. Secondary photons 22a and 22b are incident upon and detected by detectors 16f and 16e, respectively. These latter photons are imaged by Compton imaging. In the present invention as shown in FIG. 8, the first plural detectors 12a-12e can be thought of as detectors, while the second plural detectors 16a-16d can be thought of as imagers.

In the coded aperture portion of the present invention, a portion of the gamma rays are absorbed by one of the first plural detectors 12a-12e, while a second portion of the gamma rays passes through one of the gaps 14a-14d between adjacent ones of the first plural detectors and are not absorbed. These latter unabsorbed gamma rays cast a pattern onto the second plural detectors 16a-16f on the far side of the detector array away from the gamma ray source. This pattern is used to reconstruct the image. Because the far side of the detector array in the area of the second plural detectors 16a-16f is not complete with detectors, a down-sampling of the pattern occurs. The resulting down-sample pattern will be optimized by arranging the second plural detectors 16a-16f so that the side lobes in the resulting image point spread function will be as flat as possible for radiation sources coming from all possible directions in the image space of the interest. The angular differential cross section for the photon 22b to be absorbed in the system is represented by lobes identified in FIG. 8 by numbers 24 and 26 in the figure. Since photon 22b is a down-scattered photon from photon 20b these two side lobes are symmetrically positioned relative to the incoming gamma ray 20b. A third lobe 28 is shown for the differential cross section for photon 22a to be absorbed in the detection system following scattering of gamma ray 20a incident upon detector 16b. A fourth symmetrical lobe is not represented in the figure for simplicity. Each of the three lobes originates at a point of interaction of a gamma ray with a detector and indicates the probability of a scattered gamma ray being absorbed by a detector for Compton scattering imaging. The length from the point of interaction to the side of a lobe represents the angular cross section of a detector in the direction of travel of the gamma rays. This dimension in FIG. 8 corresponds to the amount of material traversed by the gamma rays in a detector, folded on the propensity for scattering of an incident gamma ray at various angles. Thus, the gamma rays most likely to be selected for Compton imaging scatter are at angles around 90°, which is favorable for superior Compton imaging due to increased angular resolution and efficiency, for most gamma-ray energies of interest.

The multi-mode imaging device 10 shown in FIG. 8 can be used to create images from a 360° field-of-view. In a direction perpendicular to the plane of the multi-mode imaging device 10 shown in FIG. 8, the detectors can all be at the same radial distance from the center of the circular array shown in FIG. 8 to provide a cylindrical detector array. Alternatively, the radius of the detector array cross section may vary so as to create a spherical detector array, a section of a spherical detector array, or any combination thereof. A spherical array of detectors in accordance with the present invention would provide an omni-directional detection capability. The detector array may also assume the shape of various polygonal lines to form prisms if the shape of the planar cross section is maintained for the entire array. The shape of the planar cross section of the array may also be varied so as to form various detector array shapes including parallelepipeds, Platonic solids such as cubes, icosahedrons, Archimedean solids such as cuboctahedrons, and icosidodecahedrons, bicuboctehedrons, or combinations thereof. These various detector array configurations also ensure a high degree collimation of the gamma rays which are incident at a steep angle relative to the face of the detectors, i.e., toward the edge of the detection set-up as viewed from the source of radiation. The above-described detector arrays also increase the collimation of gamma rays that do not fall perpendicularly on a detector, providing improved imaging performance.

In the Compton imaging function carried out by the present invention, the gamma rays will undergo Compton scattering on either near-plane first plural detectors 12a-12e or on the second plural far-plane detectors 16a-16d. Because of the convex geometry of the multi-mode imaging device 10, there is an increased probability of scattered gamma rays being absorbed by the lateral detectors such as shown for the case of detectors 16e and 16f. An increased absorption probability exists at scattering angles on the order of 90° providing increased imaging angular resolution. Because the electrons scattered are originally bound in an atom, interaction of a gamma ray with an electron results in a distribution, or broadening, of the energy transferred during the scattering process. This broadening is the equivalent of a measurement error in scattering angle. The above discussed lobes illustrate the scattering of gamma rays over large angles which provide more accurate scattering energy measurements. The multi-mode imaging device 10 is adapted for compact assembly so as to be used as a hand-held device, or on a tripod or cart, or other moving platform. A positioning system can be combined with the multi-mode imaging device 10 to keep track of the position and orientation of the detectors. Keeping track of the position and orientation of the array facilitates the production of three dimensional images, as well as high resolution images while the multi-mode imaging device 10 is in motion.

For image reconstruction, there is a set of standard algorithms for use in Compton imaging. For coded aperture imaging, however, due to the incomplete "image plane" of the present invention, a standard cross-correlation coded aperture image reconstruction algorithm cannot be used reliably. Rather, a compressive sensing algorithm can be used with the present invention. This type of compressive sensing algorithm is described in "Compressive Sensing" by Richard G. Baraniuk, IEEE Signal Processing Magazine, 118, July 2007, incorporated by reference herein. The detectors closest to the source of radiation act as coding detectors, creating a shadow that is the cross-correlation between the image and transmission map. The detectors farthest from the radiation source act as down-sampling elements, i.e., the shadow image is sampled only where a position is filled by a detector.

If the image map is represented as I, and the code is represented as C, the projection P is given by the expression:

$$P = C*I \qquad \text{Equation 2}$$

Because not all pixels are covered by a detector, the measured map M is the result of the down sampling operator D applied to the projection P given by the following expression:

$$M = D(P) \qquad \text{Equation 3}$$

The compressive sensing approach referred to above calls for a basis W in which the image I is sparse and is given by the expression:

$$I = WT \qquad \text{Equation 4}$$

where T is the sparse representation associated with Nyquist band-limited signal sampling in performing a wavelength transform which provides a wavelength matrix of the image.

Combining the above equations, provides the following equation to invert:

$$M = D[C*(WT)] \qquad \text{Equation 5}$$

By inverting this equation, the sparse representation T will be obtained. For performing the inversion, standard estimation algorithms can be used, such as: expectation maximization, conjugate gradient type methods, and Bayesian methods. Following inversion, the image is given by equation 4.

If the image is naturally sparse in its normal representation, there will be no need to find another base W. In this case, a simple inversion algorithm can be used. The above described image reconstruction approach can also be used in a system comprised of parallel planes of detectors, with each plane being either completely or partially filled with detectors.

Figure 9:
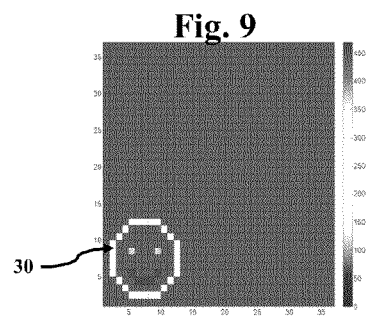
FIGS. 9-13 illustrate the processes for image formation and image reconstruction using compressive sensing techniques for a system of two parallel planes of detectors, with each plane being on the order of 50% filled with detectors which demonstrate the capability of incomplete projection planes to provide images.
Figure 11:
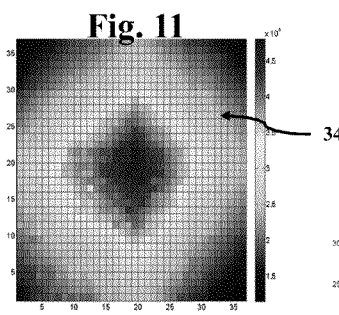
Figure 10:
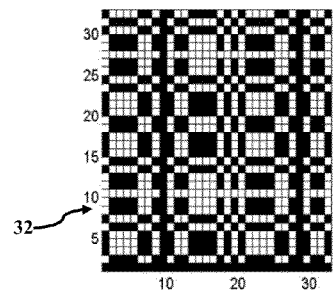
Figure 12:
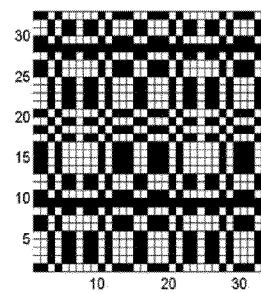
Figure 13:
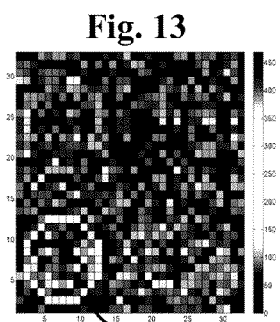

FIGS. 9-13 illustrate the processes involved in the above described image reconstruction approach. FIG. 9 illustrates the processes for image formation and image reconstruction using compressive sensing for a system of two parallel planes of detectors, each with a 50% composition of detectors. FIG. 9 illustrates the capability to use incomplete projection planes as in the case of those described above in terms of the present invention to provide complete images of high resolution. FIG. 9 illustrates a simulated image 30 on which Poisson noise is added convoluted with a mask 32 such as illustrated in FIG. 10. This creates the projection image 34 illustrated in FIG. 11. The detection plane 36 shown in FIG. 12 down-samples the projection image 34. The result 38 of the compressive sensing inversion is shown in FIG. 13. The illustrated sequence of steps taken in reconstruction of a video image in accordance with the present invention as shown in FIGS. 9-13 demonstrates the capability of the use of incomplete projection planes as described above in terms of the present invention to provide complete, high resolution images.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. An apparatus for detecting radiation emitted by a source comprising: first and second plural radiation detectors and gaps arranged in a spaced manner forming the outer wall of a closed geometric array, wherein a first portion of incoming radiation is incident upon said first plural detectors and undergoes Compton scattering and a second portion of said incoming radiation passes through said gaps between adjacent ones of said first plural radiation detectors, wherein said gaps and said first plural radiation detectors form a coded aperture array, and wherein at least part of said second portions of said incoming radiation is incident upon said second plural radiation detectors for providing Compton scattering and coded aperture imaging of the detected radiation and location information of the source of radiation.

2. The apparatus of claim 1, wherein each of said first and second plural radiation detectors is a modular detector.

3. The apparatus of claim 1, wherein each of said first and said second plural radiation detectors is a semiconductor.

4. The apparatus of claim 3, wherein each of said first and second plural radiation detectors is comprised of CdTe, CdZnTe, pixilated CdZnTe, or a coplanar grid of CdZnTe.

5. The apparatus of claim 1, wherein each of said first and second plural radiation detectors is a scintillator.

6. The apparatus of claim 5, wherein each of said first and second radiation detectors is comprised of $LaBr_3(Ce)$, $LaCl_3$ (Ce), $SrI_2$, $BaI_2$, or NaI(Tl).

7. The apparatus of claim 1, wherein the closed geometric array of said first and second plural radiation detectors is a circle, a cylinder, a sphere, a section of a sphere, or a combination thereof.

8. The apparatus of claim 1, wherein said closed geometric array of said first and second radiation detectors is in a shape of a prism.

9. The apparatus of claim 8, wherein said prism is in the form of a tetrahedron, a hexahedron, an octahedron, a duo-decahedron, or an icosahedron.

10. The apparatus of claim 8, wherein said prism is in the form of an archimedean solid.

11. The apparatus of claim 1, wherein the gamma rays passing through gaps between adjacent ones of said first plural radiation detectors cast a pattern onto said second plural radiation detectors used in the Compton scattering and coded aperture imaging of the detected radiation.

12. The apparatus of claim 11, wherein the pattern cast onto said second plural radiation detectors by the gamma rays passing through the gaps between adjacent ones of said first plural radiation detectors is a cross-correlation between an image and an image transmission map.

13. The apparatus of claim 12, wherein said first plural radiation detectors are coding detectors and said second plural radiation detectors are down-sampling elements.

14. The apparatus of claim 1, further comprising an image reconstruction arrangement including a compressive sensing algorithm.

15. The apparatus of claim 1, wherein at least a portion of the first and second plural radiation detectors are parallel to each other and are arranged in a mask-antimask configuration.

16. The apparatus of claim 1, further comprising a processor for generating a composite image depicting a representation of the source of the radiation and a representation of an environment of the source of the radiation.

17. A method for detecting radiation comprising:
(a) detecting incoming radiation with a first plurality of radiation detectors,
(b) detecting the incoming radiation with a second plurality of radiation detectors positioned behind the first plurality of radiation detectors,
(c) performing at least one of Compton imaging using at least the second plurality of radiation detectors and coded aperture imaging using at least the second plurality of radiation detectors,
wherein said first plurality of radiation detectors, said second plurality of radiation detectors and gaps are arranged in a spaced manner forming the outer wall of a closed geometric array.

18. The method of claim 17, further comprising generating a composite image depicting a representation of the source of the radiation and a representation of the environment of the radiation.

19. The method of claim 17, wherein the coded aperture imaging is performed using compressive sensing.

20. The method of claim 17, wherein at least a portion of the first and second plurality of detectors are parallel to each other and are arranged in a mask-antimask configuration.

* * * * *